May 12, 1942.  S. W. CLARK  2,282,938
AUTOMATIC SLIDING POLE BRAKE CONTROL FOR TWO-WHEELED TRAILERS
Filed Jan. 31, 1940

Sherman William Clark
INVENTOR

BY Robert M. Dunning
ATTORNEY

Patented May 12, 1942

2,282,938

UNITED STATES PATENT OFFICE 2,282,938

AUTOMATIC SLIDING POLE BRAKE CONTROL FOR TWO-WHEELED TRAILERS

Sherman William Clark, St. Paul, Minn.

Application January 31, 1940, Serial No. 316,563

5 Claims. (Cl. 188—142)

My invention relates to an improvement in sliding pole brake control, wherein it is desired to provide a brake particularly suited for use on trailers and the like.

In the use of trailers of various sorts it has become necessary to provide brakes which are either automatically operated, or which may be operated by the driver of the vehicle pulling the trailer. Manually controlled brakes of the latter type are commonly used in conjunction with large heavy trailers, which are in or form a part of the truck or other vehicle pulling the same. On lighter and quickly detachable trailers, such as are commonly pulled by pleasure cars, it is extremely desirable to have brakes of the automatic type. It is essential that such trailers be simple to attach, as they are often used by persons with little mechanical knowledge. In the second place such trailers are often used by persons who rent or borrow the trailers for a short period of time, making it impractical to provide mechanical connections to the brakes of the vehicle pulling the trailer.

Various types of brake mechanisms have been previously constructed which are designed to accomplish the same result. None of these previous constructions, however, have been very successful, as most of them are rather complicated in their nature and contain a multiplicity of parts, any of which may not operate properly. Furthermore, many of the previously constructed devices were so designed that upon a slight back pressure against the trailer, the brakes were applied resulting in a jerky movement of the trailer as the brakes are alternately applied, and released.

It is the object of the present invention to provide a trailer brake which is extremely simple in operation and which embodies an extremely small number of operating parts. As a result the braking system is extremely simple to manufacture and is inexpensive to produce. Furthermore, my trailer braking system is so constructed that the brakes are applied gradually, resulting in smoother operation of the brakes.

It is an object of the present invention to provide a simple slide pole designed for use as the draw bar of the trailer which may slide through a limited distance with respect to the trailer frame. To this slidable bar, which extends longitudinally of the frame, is secured a transversely extending equalizer bar which is pivoted to this slidable pole and which applies equal pressure on both of the brakes of the opposite wheels. Thus, if one brake is worn more than another of if one brake does not engage as quickly as another due to improper adjustment, the equalizer bar will act to exert the same pressure against each of the brakes.

A feature of my invention resides in the provision of a connecting cord or rod secured to the brake applying lever on the brake drums of the wheels and to connect this cable or rod to the equalizer bar by means of a resilient connection. Through the use of this resilient connection, slight movements of the equalizer bar may take place without actuating the brakes and the brakes are applied gradually, rather than with a jerky movement, making the operation of the trailer brakes smoother and more effective.

A further feature of my invention relates to the fact that the sliding pole may be simply and quickly applied to any trailer and that virtually any type of trailer having wheels embodying brakes and brake drums may be simply and quickly connected to the equalizer bar. No special construction is required for controlling the brakes, and as a result the brake system is extremely simple and inexpensive to apply.

A further feature of my invention resides in the provision of a means for locking the draw bar from movement, when it is so desired, so as to hold the brakes out of operation, and to permit reverse movement of the trailer when it is found necessary.

These and other objects and novel features of my invention will be more clearly and fully set forth in the following specification and claims.

In the drawing forming a part of my specification:

Figure 1:
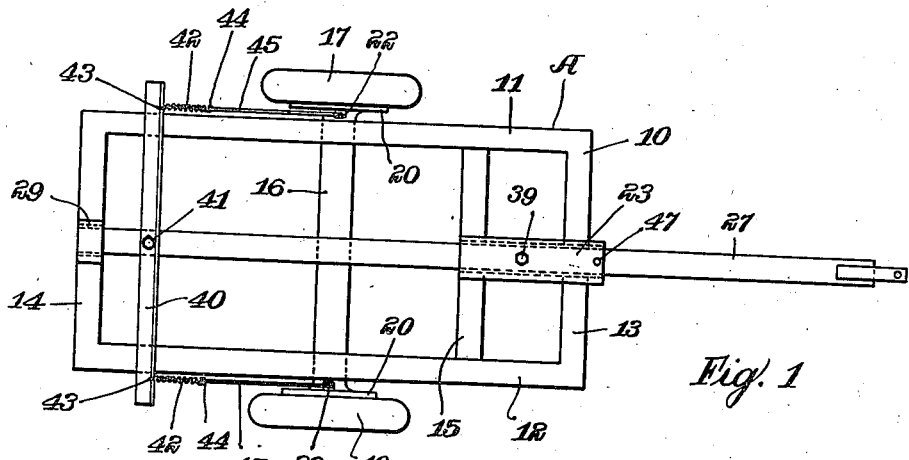
Figure 1 is a top plan view of a trailer frame embodying my invention.
Figure 2:
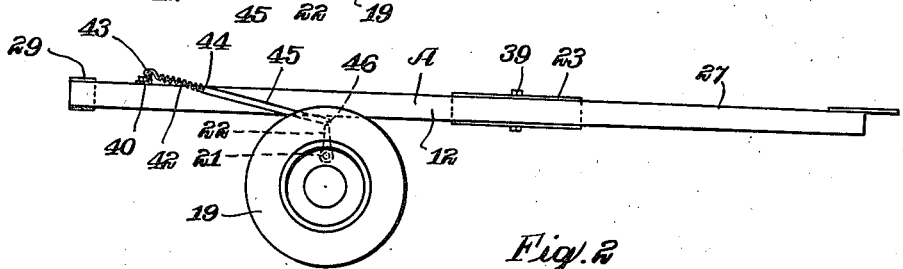
Figure 2 is a side elevation view of the trailer frame and brake system illustrated in Figure 1.
Figure 3:
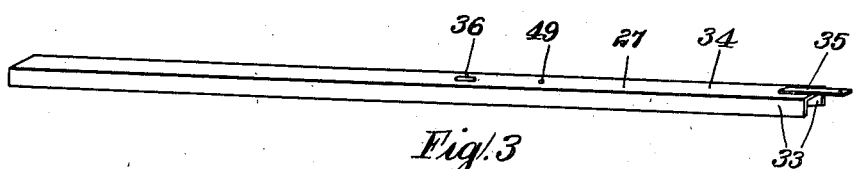
Figure 3 is a perspective view of the slidable pole or draw bar removed from the remaining structure.

The trailer, indicated in general by the letter A, comprises a substantially rectangular frame 10, including a pair of spaced parallel longitudinally extending side frame members 11 and 12, connected by a forward cross member 13, a rear cross member 14, and an intermediate cross member 15. A wheel axle 16 is mounted beneath the frame 10 in any suitable manner to extend transversely of the frame. Wheels 17 and 19 are pivotally mounted upon the axle 16 and embody brake drums of the usual type, which are not shown in the drawing. A brake drum housing 20 on each end of the axle 16 encloses the brake mechanism within the wheels 17 and 19. The brakes may be embodied within the wheels 17 and 19, and as such brakes are extremely common in the art the detail construction thereof has not been disclosed. A shaft 21 extends from each of the brake drum housings 20 and a brake operating lever 22 is secured thereto for operating the brakes. In the construction illustrated in Figure 2 of the drawing, a counter-clockwise rotation of the lever 22 acts to apply the brakes, while in the normal position illustrated in this figure, the brakes are loose within their housings.

Figure 4:
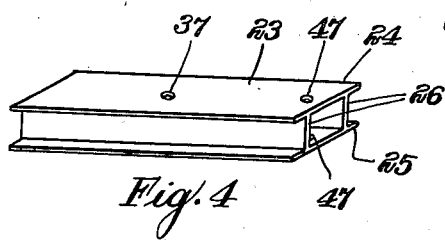
Figure 4 is a perspective view of the forward slide housing within which the slidable pole or draw bar may move.

Intersecting the front cross member 13 and the intermediate cross connecting member 15 I provide a forward slide housing 23 which is best illustrated in Figure 4 of the drawing. This housing, in the form illustrated, comprises a top plate 24, a parallel plate 25, and a pair of connecting webs 26. The plates 24 and 25 extend transversely beyond the webs 26 to permit attachment to the cross bars 13 and 15 by welding or other suitable means. The webs 26 and the plates 24 and 25 are properly spaced to accommodate the sliding pole or draw bar 27.

Figure 6:
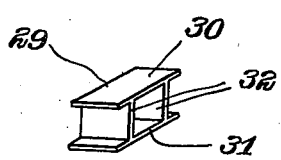
Figure 6 is a perspective view of the rear housing and containing the slidable pole or draw bar.

The rear cross member 14 is intersected by the rear slide housing 29, best illustrated in Figure 6 of the drawing. In the form illustrated, the housing 29 includes a top plate 30, a bottom or lower plate 31, and connecting webs 32 secured between the plates 30 and 31 by welding or other suitable means. As will be noted, the plates 30 and 31 extend transversely beyond the webs 32 and these projecting edges form a means of attachment between the housing 29 and the rear cross member 14. The webs 32 and the plates 30 and 31 are properly spaced to accommodate the sliding pole or draw bar 27.

It is obvious that if the sliding pole or draw bar 27 is to be connected to a trailer frame, which has been previously constructed, suitable guide means may be applied to the lower surface of the trailer to accommodate the draw bar 27.

Figure 5:
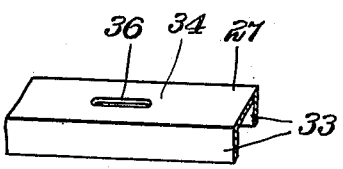
Figure 5 is a perspective view of a section of the draw bar showing the slot therein, through which a bolt may extend to limit slidable movement of the draw bar.

The draw bar 27 is illustrated as being channel-shaped in cross section, including a pair of opposed sides 33 and a connecting base 34, which is shown forming the top of the draw bar 27. A strap iron connecting member 35 is illustrated welded or otherwise secured to the end of the sliding pole or draw bar 27 to facilitate attaching the trailer to a vehicle. An elongated slot 36 is provided in the base 34 of the channel pole or draw bar 27, another portion thereof which is enclosed within the vehicle housing 23. An opening 37 is provided in the top plate 24, and an aligned opening extends through the lower plate 31 of the housing 23. A bolt 39 extends through the aligned openings 37 and through the slot 36. This bolt permits limited slidable movement of the pole 27 within the confines of the slot 36. The construction of the slot is best illustrated in Figure 5 of the drawing.

A transversely extending equalizer bar 40 is pivotally secured by the bolt 41 to the pole or draw bar 27. This transverse bar 40 may, if desired, comprise an angle iron, as illustrated, for strength. Secured near opposite ends of the equalizer bar 40, I provide coil springs or other resilient means 42. These springs 42 are pivotally connected at 43 to the equalizer bar 40 and are pivotally connected at 44 to the brake rods 45. These rods 45, which connect the springs 42 to the levers 22, are pivotally connected at 46 to the levers 22.

Apertures 47 which are vertically aligned extend through the plates 24 and 25 of the slide housing 23, and a registerable opening 49 extends through the pole 27. The openings 47 and 49 move into alignment when the brakes are released or when the pole 27 is in its forward position. A pin or bolt may be extended through the openings 47 and 49 while the pole 27 is in its forward position in order to prevent application of the brakes. Thus, the trailer may be moved rearwardly by a rearward pressure on the draw bar 27, when it is so desired.

In operation the trailer is connected to the vehicle by means of the pole or draw bar 27, which is connected to any suitable construction of hitch secured to the vehicle. As long as a forward pull is exerted upon the draw bar 27, the brakes of the trailer remain released. When the trailer tends to move faster than the vehicle pulling the same, a rearward movement is exerted against the draw bar, which slides the pole 27 rearwardly in the housings 23 and 29, thus moving the equalizer bar 40 rearwardly. A pull is accordingly exerted upon the springs 42, acting to gradually apply the brakes within the wheels 17 and 19. This application of the brakes has a tendency to slow the movement of the trailer and to again create a forward pull upon the pole 27, thus acting to release the brakes and to allow the trailer to be pulled with a minimum of effort.

In accordance with the patent statutes, I have described the principles of construction and operation of my sliding pole brake control, and while I have endeavored to set forth the best embodiments thereof, I desire to have it understood that obvious changes may be made within the scope of the following claims without departing from the spirit of my invention.

I claim:

1. A trailer brake for use in combination with a trailer frame and supporting wheels embodying brakes, comprising a draw bar extending longitudinally of the trailer, frame means secured at each end to said trailer frame slidably supporting said draw bar for limited slidable movement, means secured to one of said frame means between the ends thereof and limiting movement of said draw bar, an equalizer bar pivotally secured to said draw bar and extending transversely therefrom, and means connecting each end of said equalizer bar to the brake operating mechanism so that slidable movement of said draw bar and equalizer bar will apply said brakes.

2. A brake applying mechanism for use in combination with trailers having a frame, supported wheels, and brake actuating levers therefor comprising a pole slidably secured to said frame for limited slidable movement with respect thereto, a pair of spaced journals supporting said pole, an equalizer bar pivotally secured to said pole between said journals and extending transversely of said frame, cooperable means on said pole and one of said journals for limiting movement of said pole, and resilient means connecting said equalizer bar on opposite sides of said pivot to said brake actuating mechanism so that longitudinal movement of said pole will move said equalizer bar to apply said brakes.

3. A brake control in combination with a trailer having a frame, a pair of supporting wheels embodying brakes and brake actuating mechanism, the control comprising a longitudinally extending draw bar, a pair of aligned journals on said frame slidably supporting said draw bar for limited slidable movement, means extending through one of said journals and said bar to limit longitudinal movement, a transversely extending equalizer bar extending transversely of the frame into longitudinally spaced relation to said brake actuating mechanism, and connecting means including resilient means connecting said equalizer bar and said brake actuating mechanism.

4. A trailer brake control in combination with a trailer having a frame, supporting wheels embodying brakes, and brake actuating mechanism, the control comprising a pair of longitudinally aligned journals, a draw bar slidably supported by said journals, said draw bar having a slot therein, a bolt extending through one of said journals and said slot limiting the slidable movement of said draw bar, an equalizer bar pivoted between its ends to said draw bar, said equalizer bar extending into longitudinally spaced relation with said brake actuating mechanism and longitudinally extending connecting means including resilient means connecting said brake actuating mechanism to said equalizer bar.

5. A trailer brake control in combination with a trailer having a frame, supporting wheels secured thereto embodying brake mechanism and brake actuating mechanism for operating said brake mechanism, said control comprising a pair of longitudinally aligned journals, a draw bar slidably supported by said journals, said draw bar having a slot therethrough, limiting means extending through one of said journals, and through said slot to limit slidable movement of said draw bar, a pair of aligned apertures through said one journal and through said draw bar when said draw bar is in one extreme position adjusted to accommodate a locking pin, an equalizer bar pivoted between its ends to said draw bar, said equalizer bar extending transversely of said frame into longitudinally spaced relation to said brake actuating mechanism, and connecting means including resilient means connecting said brake actuating mechanism to said equalizer bar and extending longitudinally of said frame.

SHERMAN WILLIAM CLARK.